Jan. 23, 1940.  B. J. CRAIG  2,187,933
VEHICLE DOOR LATCH
Filed May 7, 1938  5 Sheets-Sheet 1
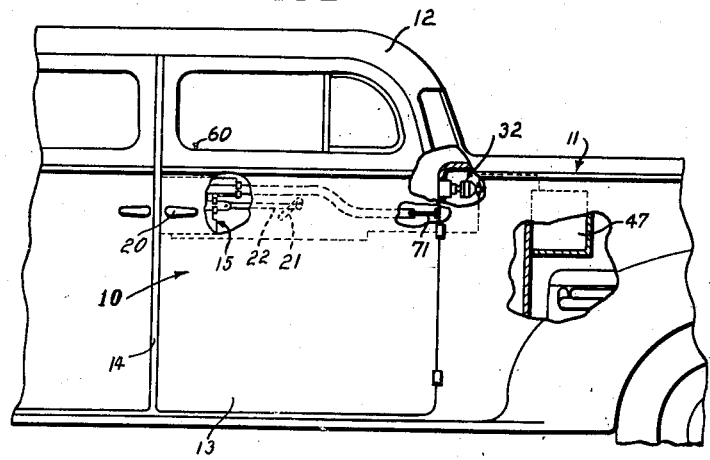
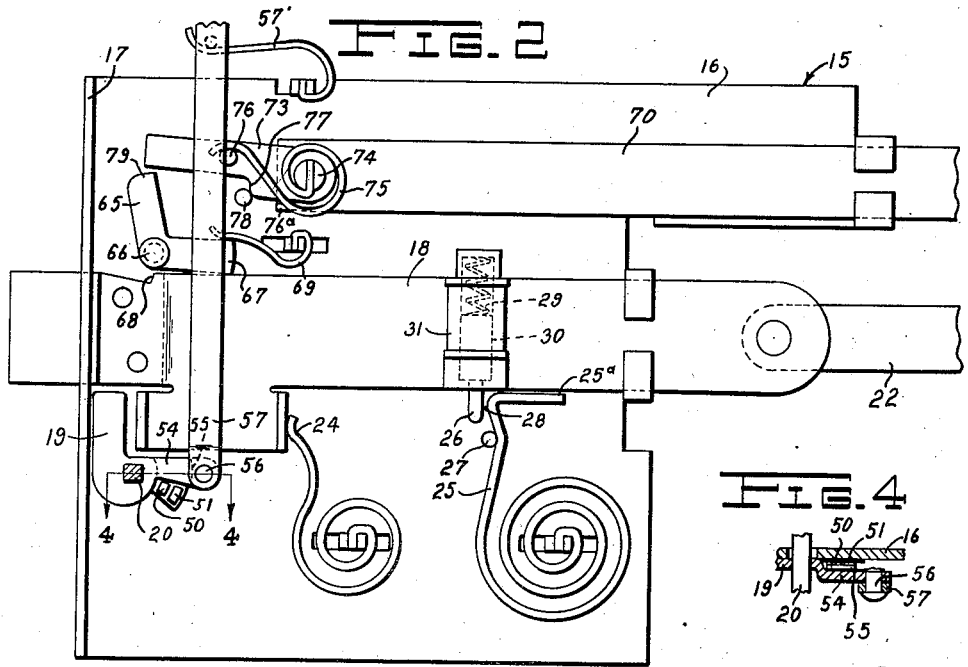
INVENTOR.
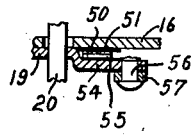

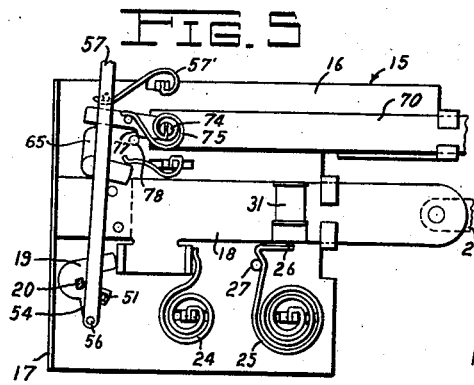
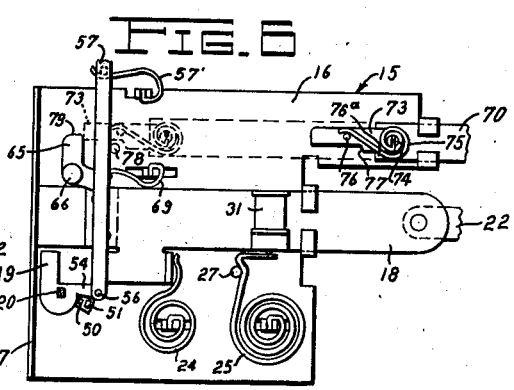
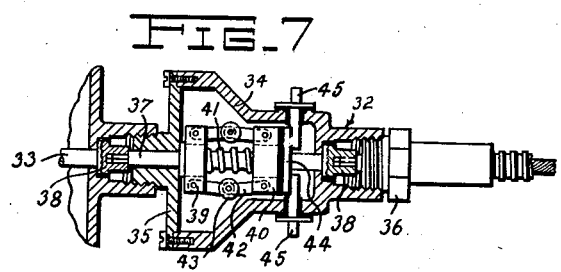
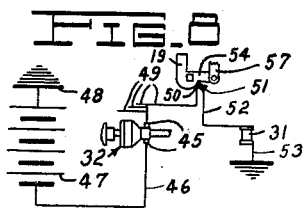
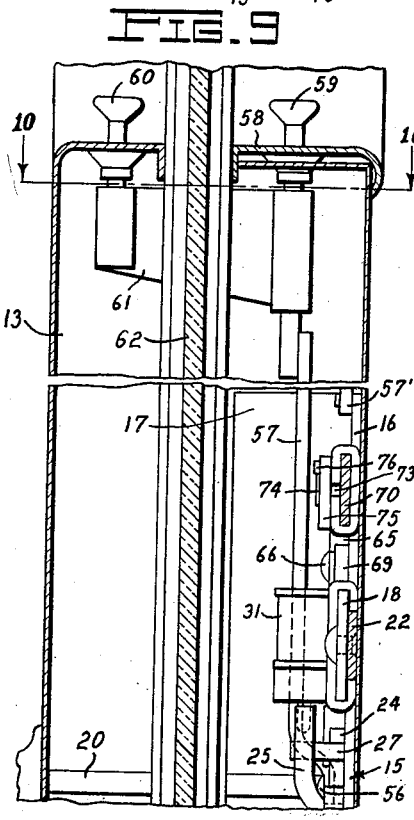
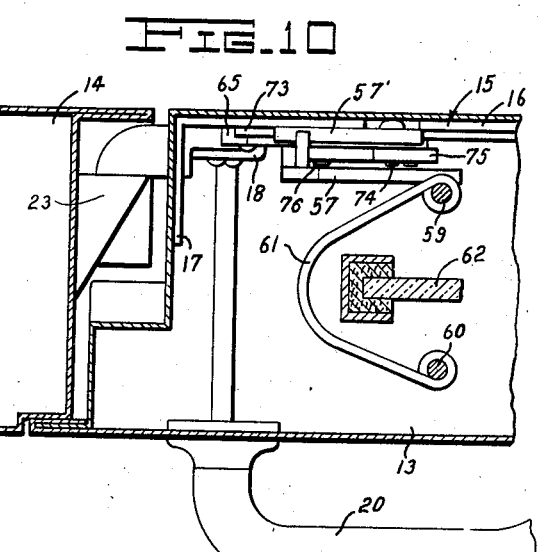

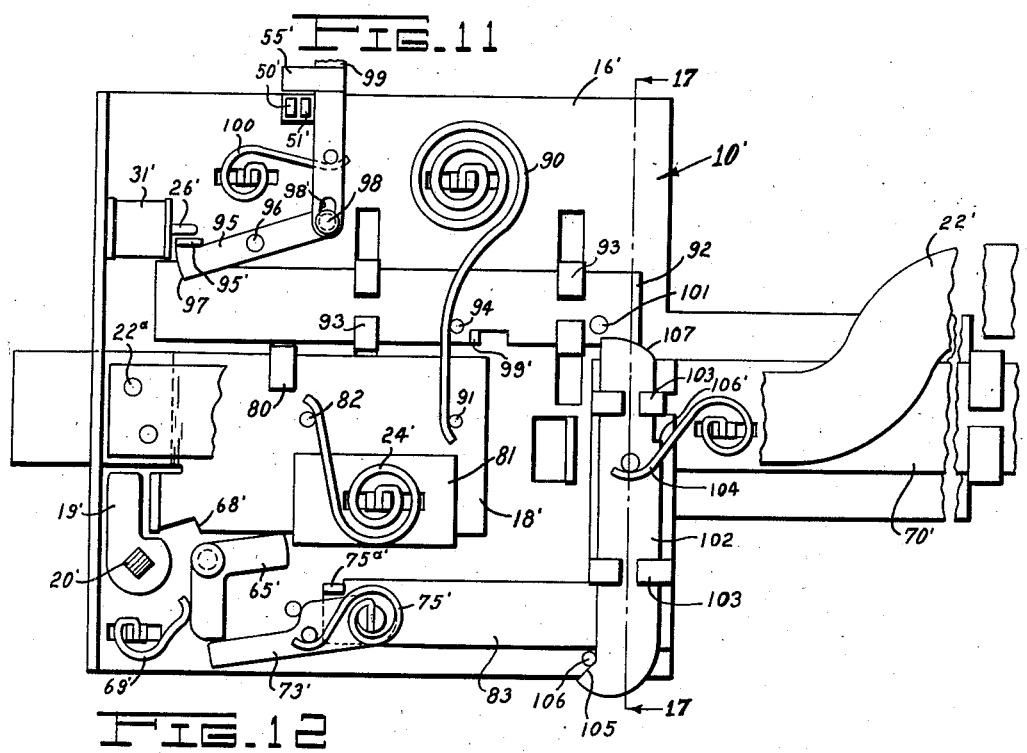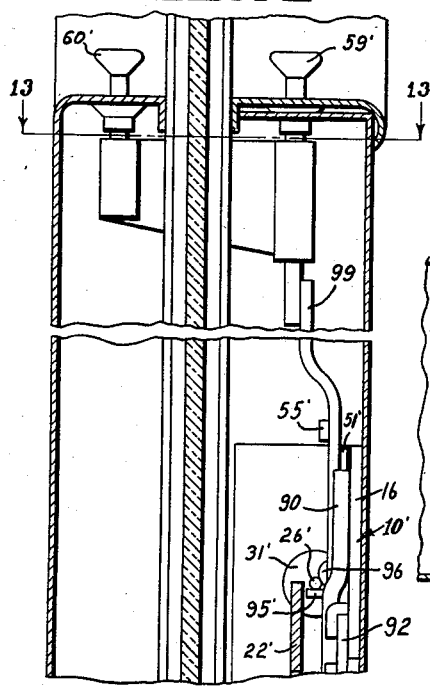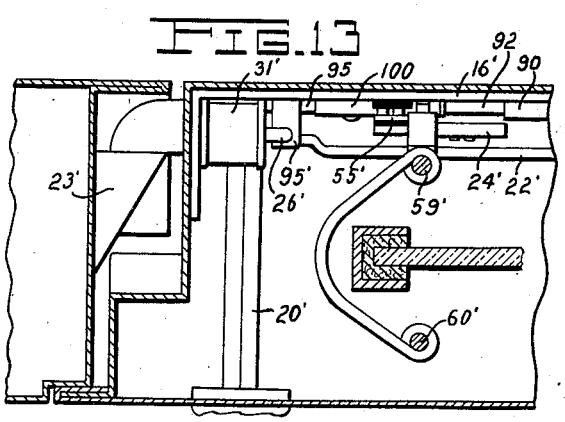

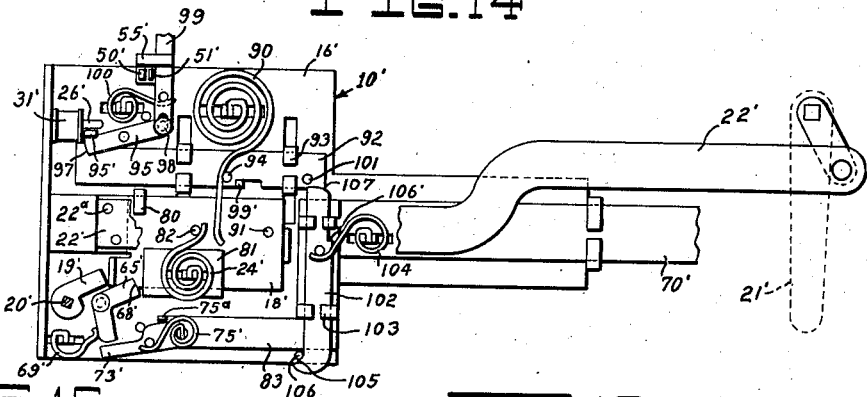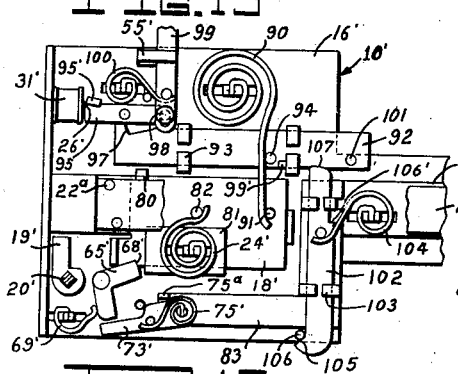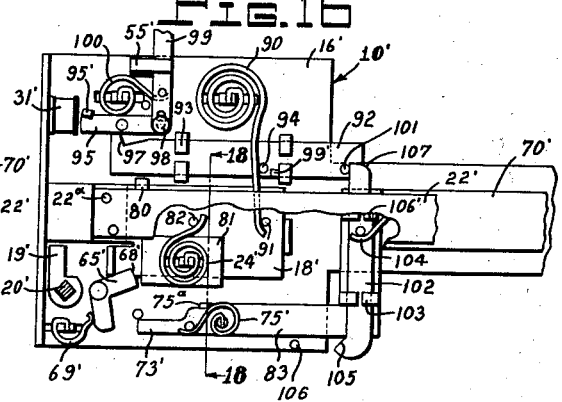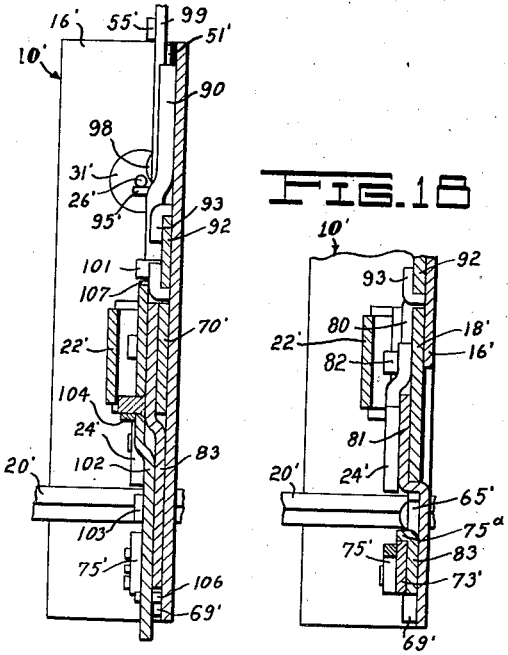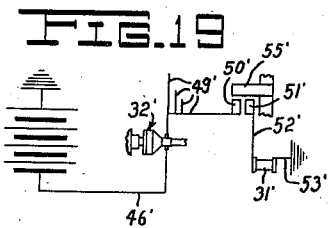

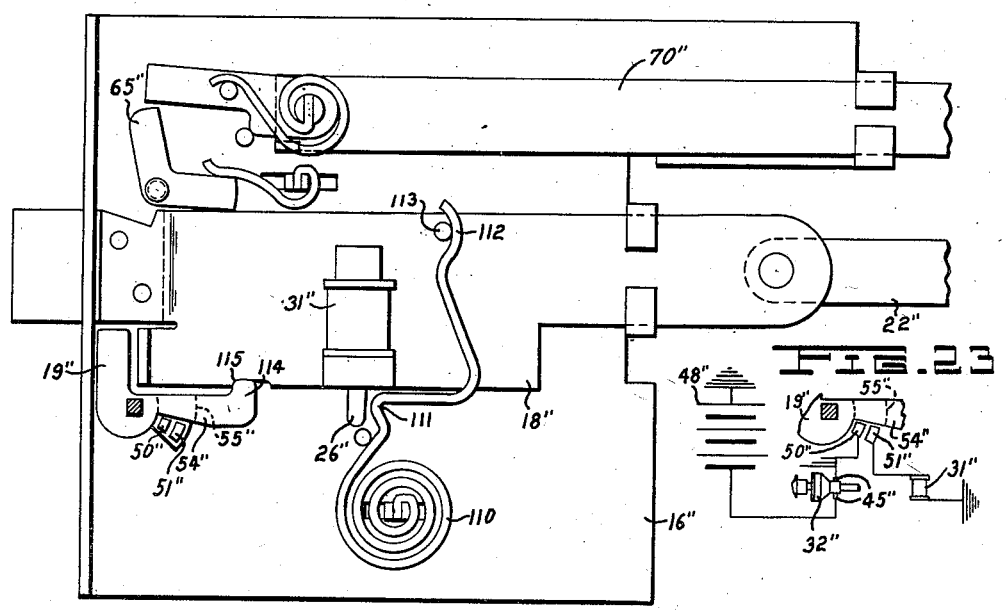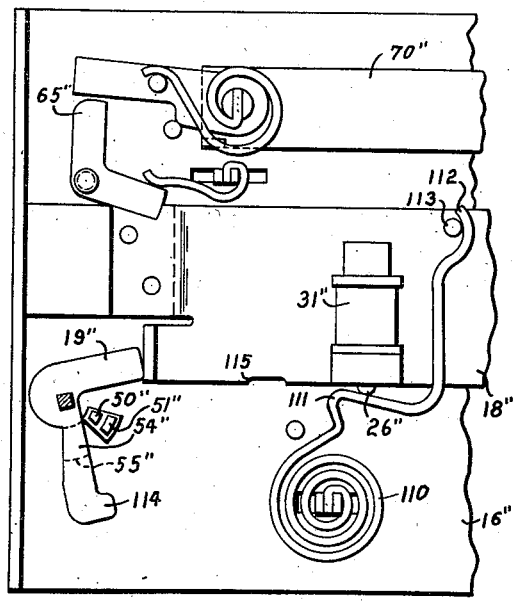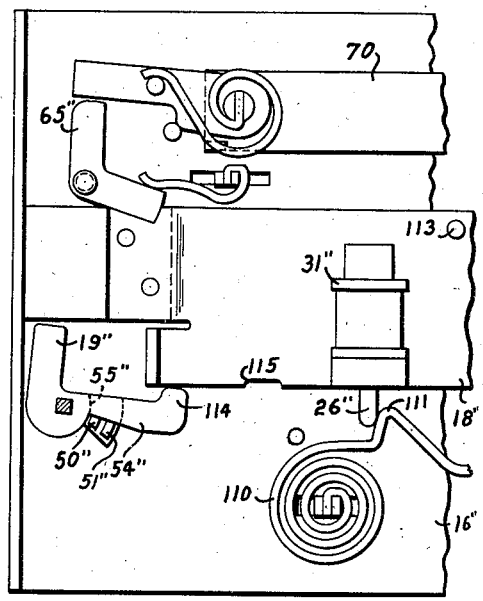

Patented Jan. 23, 1940

2,187,933

UNITED STATES PATENT OFFICE 2,187,933

VEHICLE DOOR LATCH

Burnie J. Craig, Los Angeles County, Calif.

Application May 7, 1938, Serial No. 206,534

23 Claims. (Cl. 180—82)

This invention relates to door latching mechanism which is particularly, although not exclusively, adapted for use in connection with the doors of automotive vehicles, a general object being to provide a mechanism including cooperating parts adapted to be mounted upon the door and/or frame and/or body pillar with the parts acting in improved and effective manner so that the door may be closed quietly and be opened safely and easily.

The general object of the invention is to provide a door construction for an automotive vehicle including a latch member wherein in latching the bolt may be operated only with difficulty while the vehicle is in rapid motion but which can be readily operated when the vehicle is still thus avoiding accidental opening or opening by children or others.

A further object of the invention is to provide a novel operating means for the latch means of the doors of automotive vehicles.

A further object of the invention is to provide a novel finger tip control for the latch member of the door of an automotive vehicle.

Another object of the invention is to provide a novel, speed controlled, latching means for the door of an automotive vehicle.

Another object of the invention is to provide novel means for holding the latch member of an automotive vehicle retracted, when the door is open, to prevent soiling the clothes or person of the vehicle occupant.

Other objects and the advantages of my invention will be apparent from the following description taken in connection with the accompanying drawings, wherein:

Fig. 1 is a fragmentary side elevation of a motor vehicle equipped with the invention;

Fig. 2 is a side elevation showing the latch device in the closed position;

Fig. 3 is a top plan view of the latch device with parts broken away;

Fig. 4 is a fragmentary section taken on line 4—4 of Fig. 2;

Fig. 5 is a side elevation showing the latch device in another position;

Fig. 6 is a side elevation showing the latch device in another position;

Fig. 7 is a central sectional view through the governor;

Fig. 8 is a wiring diagram;

Fig. 9 is a fragmentary sectional view of the latch device mounted on a door;

Fig. 10 is a fragmentary section taken on line 10—10 of Fig. 9;

Fig. 11 is a side elevation showing a modified construction;

Fig. 12 is a fragmentary sectional view of the modified latch device mounted in a door;

Fig. 13 is a fragmentary sectional view taken on line 13—13 of Fig. 12;

Fig. 14 is a side elevation of the modified latch device shown in another position;

Fig. 15 is a side elevation of the modified latch device shown in another position;

Fig. 16 is a side elevation of the modified latch device shown in another position;

Fig. 17 is a section taken on line 17—17 of Fig. 11;

Fig. 18 is a fragmentary section taken on line 18—18 of Fig. 16;

Fig. 19 is a wiring diagram;

Fig. 20 is a side elevation of a further modified construction;

Fig. 21 is a fragmentary side elevation of the further modification with the latch in another position;

Fig. 22 is a fragmentary side elevation of the further modification showing the latch device in another position; and Fig. 23 is a wiring diagram.

Referring to the drawings by reference characters the present invention is shown in Figs. 1 to 10 as embodied in a door latch mechanism which is indicated generally at 10 and is shown as mounted upon an automotive vehicle indicated at 11.

The vehicle shown has a body 12 of the sedan type and includes doors 13 mounted on suitable hinges secured to the door frame, to swing towards and from a body-pillar 14.

The doors are preferably alike and but one will be described. Each door includes a latch device indicated at 15 mounted on a plate 16 having a flange 17 and suitably secured upon the door. The sliding latch member indicated at 18 is controlled by a roll back 19 which is actuated by the outside door handle 20 or by a remote control handle 21 which shifts an actuator 22 so that when the handle 21 is turned in one direction the latch member is moved to door releasing position. A strike 23 is engaged by the bolt.

In the present invention, as shown, a spring 24 normally urges the latch bolt 18 to advanced position. The spring 24 is preferably a light one thus enabling the latch member to be retracted easily and quickly.

The use of a light easily controlled spring, however, if left unguarded might produce a condition in certain circumstances which while the vehicle was running would permit the door to open accidentally or might allow it to be opened by curious persons, such as children.

To overcome this possibility a novel speed responsive control is provided for the latch member. As shown the construction includes a spring 25 which is disposed on the plate 16 adjacent to the latch member 18 in the path of movement of a retractable pin 26. This pin 26 is normally in a position so that when the latch member is rocked by the door handles 20 or 21 the pin 26 engages the spring 25 so that both the springs 24 and 25 must be tensioned to open the door.

The pin 26 is normally out of engagement with the spring 25, the latter engaging a stop 27 on the plate 16 so that the spring and pin are spaced apart, as at 28. The pin 26 is normally free to fall by gravity to a position so that it may engage the spring 25 and is also normally urged to the position shown by a spring 29. The pin 26 is shown as continuous with the core 30 of a solenoid 31 which is mounted on the latch member 18, the construction being such that when the solenoid is energized the pin 26 will be moved from its normal position to a location out of the path of movement of the spring 25. Thus it will be seen that after the solenoid 31 is energized only the spring 24 need be tensioned to slide the bolt.

In order to vary the tension required to retract the bolt a speed responsive device is employed. This device is shown as a governor 32 (see Fig. 7) connected to a speedmeter drive shaft 33 although it will be understood that this speedometer shaft is merely illustrative of one device which is responsive to speed and that the governor 32 may be otherwise driven so long as it responds to the speed of some portion of the vehicle or its driving means.

The governor 32, as shown includes a body 34 having a closure 35 thereon at one end and having a plug closure 36 at the other end. The body includes a shaft 37 which rotates therein and which at each end includes a coupling 38 of any desired type by means of which the shaft 37 is coupled to the speedometer shaft 33.

The shaft 37 includes a collar 39 fixed thereon and a second collar 40 slidable thereon, the collars being urged apart by a spring 41. The collars are connected by pivoted arms 42 which have governor weights 43 thereon and the construction is such that when the shaft 37 revolves the weights 43 move outwardly thus compressing the spring 41 and shifting the movable collar 40. The tension of the spring 41 determines the shifting of the movable collar so that the latter is moved from its extreme position when the speedometer shaft rotates at a predetermined speed. The collar 40 has an insulating portion on which a metal circuit closer 44 is mounted. The circuit closer 44 when the spring urges it to operative position engages contact pins 45 on the body 34.

One of the pins 45 is connected by a lead 46 (see Fig. 8) with a battery 47 which is grounded as at 48. The other pin 45 is connected to a plurality of leads 49. Each lead 49 is connected to a contact 50 on a door 13 and is arranged adjacent to a second contact 51 which is connected by a lead 52 with the solenoid 31. The solenoid is grounded by a lead 53. The contacts 50 and 51 are mounted on the plate 16 in the path of movement of a projection 54 on the roll back 19. The projection 54 includes a circuit closer 55 which is adapted to bridge the contact 50 and 51.

The projection 54 on the roll back 19 is pivotally connected as at 56 to a finger tip control member 57 which, as shown, passes through an aperture in the garnish molding 58 inside of the window and the construction is such that when a push button 59 at the end of the control member 57 is depressed it rocks the roll back member 19. A spring 57' normally urges the control member 57 upwardly.

The control member 57 as shown may be operated by a finger tip push button 60 disposed above the molding on the outside of the door. The push button 60 is mounted on a U-shaped member 61 which extends about the window glass 62 and engages the member 57. It will be noted that one speed controlled member (the governor 32) functions with the latches of all the doors.

The present construction thus provides a finger tip door control which operates independent of the usual door handles 20 and 21 and which operates without drain on the battery since no current flows except during the interval when the bolt is being retracted. Since there is normally no pressure on the pin 26 except that of the spring 29 the pin can be moved by a small solenoid.

From the foregoing description it will be apparent that when either of the finger tip control members 59 or 60 is operated when the door is latched and the vehicle is at rest or is moving so slowly that the circuit is closed through the governor 32 the circuit will be closed (as a preliminary to withdrawal of the bolt) through the contacts 50 and 51. This causes the pin 26 to be withdrawn whereby the spring 25 is ineffective to restrain the action of the roll back so that a finger tip-pressure on the members 20 or 21 is all that need be employed when it is safe to open the door.

When it is dangerous to open the door the pin 26 on the latch member 18 engages the spring 25 and thus the opening act requires more force than can readily be exerted by finger tip pressure. Thus the finger tip control is not conveniently operable at a time when opening a door is dangerous. At such time, in case of emergency, the interior handle 21 (or the exterior handle 20) may be operated as is customary with the usual type of door latch. Also the door handles 20 or 21 may be employed when the vehicle is at rest to open the doors and in this operation the handles 20 or 21 will be movable easily since the spring 25 will not function to restrain the latch member.

An end portion 25a on the spring 25 prevents the pin 26 from getting behind the spring when the solenoid is de-energized while the latch member is retracted.

In order to hold the bolt member 18 retracted while the door is open a dog 65 may be provided. As shown the dog 65 is pivoted, as at 66, to the plate 16 and includes an end portion 67 which engages a notch 68 in the latch member 18 unless the latch member is retracted. A spring 69 normally urges the portion 67 to engaged position as shown in Figs. 5 and 6.

To control the dog 65 a sliding member 70 is mounted upon the plate 16 and is pivotally connected to a link 71 mounted on the door frame, so that when the door is opened and closed the sliding member 70 moves along the door. The end of the member 70 is provided with a trip member 73 which is pivoted at 74 and is normally urged downwardly by a spring 75 which engages a pin 76 on the trip member. A tongue 76a on the member 70 limits the downward movement of the two members.

When the door is being closed, as in Fig. 6, the bolt is held retracted by the dog 65 until the end of the trip member engages the dog and pushes it from the notch 68. This action occurs when the door is almost closed so that the bolt latch member is free to advance. As the door is fully closed a cam shoulder 77 on the trip member engages a pin 78 on the plate 16 and rocks the trip member upwardly so that it passes above the upper end 79 of the dog as shown in Fig. 2. This end 79 is then free to rock under the trip member when the bolt 18 is again moved to retracted position as shown in Fig. 5.

When the door is opened the member 70 moves to the right in Fig. 5 until the shoulder 77 is free from the pin 78 whereupon the parts assume the position shown in Fig. 6 so that the trip member is again in a position to rock the dog 65.

In Figs 11 to 19 inclusive a modification of the invention is shown wherein novel means is provided for moving the latch bolt to disengaged position. In the modification the latch mechanism is indicated at 10' and includes a plate 16' having a latch member 18' mounted to slide between tongues 80 and 81 punched from the plate 16'. The latch member is controlled by a roll back 19' which is actuated by an outside door handle member 20' or by a remote control inner handle member 21'. The member 21' shifts an actuator 22' which is connected to the bolt member 18' at 22a. A strike 23' is engaged by the bolt end of the latch member.

A spring 24' mounted on the tongue 81 engages a pin 82 on the latch member 18' to normally urge the latch member towards engaged position.

In order to hold the bolt member 18' in retracted position a pivoted dog 65' is provided which engages in a notch 68' on the bolt member. A sliding member 70' is mounted on the plate 16' and is moved in the same manner in which the member 70, previously described, is moved. The member 70' has an L-shaped end portion 83 welded thereto and on the portion 83 a trip member 73' is mounted. A spring 75' normally urges the trip member 73' upwardly against a shoulder 75a'. A spring 69' normally urges the dog 65' to engaged position. The operation of the dog 65' by the trip member 73' is the same as that previously described in connection with the dog 65 and trip member 73.

In order to move the bolt member 18' from its advanced position to its retracted position so that the door may be opened a spring 90 is provided which is mounted on the plate 16' and which engages a pin 91 on the latch member 18'. The strength of the spring 90 relative to the spring 24' is such that the spring 90 will move the latch member 18' against the tension of the spring 24' and will also overcome the friction between the latch member 18' and its strike.

In order to restrain the spring 90 so that it does not prematurely slide the latch member to disengaged position a trigger mechanism is provided. As shown the trigger mechanism includes a member 92 slidable beneath tongues 93 on the plate 16' and which has a pin 94 thereon disposed in the path of the spring 90. To hold the member 92 against movement and thus arrest action of the spring 90 I provide a latch 95 which is pivoted at 96 to the plate 16' and which fits in a notch 97 in the member 92.

The latch member 95 is pivotally connected by a pin 98 to a control member 99 which includes a slot 98' receiving the pin 98 and has push buttons 59' and 60' similar to the push buttons 59 and 60 previously described. A spring 100 normally urges the control member 99 to a position wherein the latch member 95 is engaged. In order to provide speed control means for the control member 99 a solenoid 31' is employed which includes a pin 26'. The pin 26' is in the path of a tongue 95' on the latch member 95. The solenoid 31' and pin 26' are similar in all respects to the solenoid 31 and pin 26 previously described and are in a circuit (Fig. 19) which includes a governor 32' and spaced contacts 50' and 51' which are adapted to be bridged by a circuit closer 55' mounted on the control member 99 and the operation of the circuit including leads 46', 49', 52' and 53' is similar in all respects to that of the circuit previously described.

When the parts are in the position shown in Fig. 11 either the door handle 20' or the remote control handle 21' may be operated to shift the latch bolt 18' and in this operation the usual action will occur and the spring 90 will remain inactive being restrained by the pin 94.

When the parts are in the position shown in Fig. 11 and either the finger tip control button 59', or the button 60' is depressed, this action will first cause the member 99 to move downwardly so that the circuit closer 55' bridges the contacts 50' and 51'. When this is done, if the governor 32' maintains the circuit open (as it may when the vehicle is running at any appreciable speed) the pin 26' will prevent rocking of the latch member 95 due to further downward movement of the control member 99. Thus the door cannot be opened by the finger tip control but may be opened by the door handles.

If the circuit through the governor 32' is closed then when the contacts 50' and 51' are bridged by operation of the finger tip control the solenoid will be energized thus withdrawing the pin 26' from the path of the tongue 95' on the latch 95 thus allowing further movement of the control member 99 causing the latch 95 to be freed, thus releasing the sliding member 92 so that it is moved by the spring 90 and the latch member 18' is moved to disengaged position by the spring 90 whereupon the parts assume the position shown in Fig. 15 where a tongue 99' on the slide 92 engages a tongue 93.

As the sliding member 92 is thus moved a pin 101 thereon moves outwardly beyond a slide 102 which is arranged beneath the actuator 22' and which is movable beneath tongues 103 on the member 83. The slide 102 is normally urged towards the pin 101 by a spring 104 and is prevented from advancing when in the position shown in Fig. 11 by engagement of a bevelled portion 105 thereon with a pin 106 on the plate 16'.

After the latch member has been retracted, as previously described, and when the door is swung to open position the member 70' is moved to the right thus moving the slide 102 so that the bevelled portion 105 leaves the pin 106 and is free to be moved upwardly by the spring 104. Upward motion of the slide 102 continues until a shoulder 106' engages one of the upper tongues 103.

While the door is being opened and after the slide has moved upwardly the curved upper end 107 of the slide 102 engages the pin 101 and is depressed, thus allowing the slide to run under the pin 101 until it passes the latter and is again urged upwardly by the spring 104 to the position shown in Fig. 16.

When the door is closed the member 70' moves to the left in Fig. 16 thus moving the slide 102 and the latter by its engagement with the pin 101 moving the member 92, thus tensioning the spring 90 due to its engagement with the pin 94. This tensioning of the spring continues until the latch 95 enters the notch 97 just before the pin 106 engages the bevelled surface 105. Further slight movement of the member 70' as the door is fully closed causes the surface 105 to engage the pin 106 and shift the slide 102 downwardly so that it frees the pin 101 whereupon the parts assume the position shown in Fig. 11.

In Figs. 20 to 23 a further modification of the invention is shown wherein a latch plate 16" slidably supports a latch member 18" which is adapted to be shifted to retracted position by means of a roll back 19" operated by an outside door handle (not shown) or by a remote control handle (not shown) which operates an actuator 22".

A spring 110 mounted on the plate 16" includes a portion 111 disposed in the path of a pin 26" on a solenoid 31", which are like the pin and solenoid 26 and 31 previously mentioned. The spring continues from the portion 111 to an upper portion 112 which engages a pin 113 on the control member 18". The roll back 19" includes a circuit closer 55" which is like the circuit closer 55 and which bridges contacts 50" and 51".

The roll back 19" includes an end portion 114 which engages an inclined surface 115 on the latch member 18" so that when the latch member is shifted by the actuator 22" the engagement between the portions 114 and 115 rocks the roll back and closes the circuit from the contact 50" across the contacts 50" and 51". This action occurs before the pin 26" engages the spring 110.

When the roll back 19" is operated by the outside door handle the same condition prevails so that in either case the circuit is completed to a governor 32" similar in all respects to the governor 32 and which includes contacts 45" one of which is in circuit with the contact 50" and the other of which is in circuit with a battery 48".

When the vehicle is moving at such speed that the circuit is broken between the two contacts 45" the pin 26" remains in engagement with the spring 110 so that when the latch member is shifted by either handle the pin 26" engages the spring 111 so that the latter must be tensioned in order to open the door. The leverage under this condition is such that considerable force is required to open the door so that the safety feature previously described is present.

When, however, due to the speed of the vehicle being decreased sufficiently so that the contacts 45" are bridged, then under this condition when either the inside or outside door handle is operated the circuit is closed to the solenoid 31" whereupon the pin 26" is withdrawn. As the latch bolt is shifted the only resistance offered by the spring 110 is at the portion 112 at which location the resistance is so slight that a finger tip control on the door handles is all that is necessary to shift the latch bolt.

In the further modification described the means for holding the latch member retracted and the means for releasing the holding member as indicated at 65" and 70" respectively are similar in all respects to the members 65 and 70 previously described.

Having thus described my invention I claim:

1. In an automotive vehicle construction, a frame member, a door member hinged to the frame member, a bolt on one of the members movable to engage the other member to hold the door member closed, means to restrain retraction of the bolt, means responsive to the speed of the vehicle to vary the force of the restraining means so that the bolt is under the influence of a light force or a heavy force, finger operated means effective to retract the bolt when under the influence of the light force, said finger operated means being ineffective to shift the bolt when under the influence of the heavy force and hand operated means to shift the bolt when under the influence of the heavy force.

2. In an automotive vehicle door latch, a bolt, means to restrain movement of the bolt from engaged position, means operable at all times to move the bolt to disengaged position, and speed controlled means on the vehicle operable to vary the force of the restraining means.

3. The combination with an automotive vehicle having a door and a bolt for holding the door closed, of tensioned means to hold the bolt in engaged position, means to move the bolt to disengaged position and means to vary the tension of the tensioned means when the vehicle speed is varied.

4. In an automotive vehicle construction, a frame member, a door member hinged to the frame member, a bolt on one of the members movable to engage the other member to hold the door member closed, means to restrain retraction of the bolt, means whereby the speed of the vehicle determines the force of the retraction restraining means and means to retract the bolt.

5. In a latch for an automotive vehicle door member, a lock movable to hold the door member closed, means to restrain retraction of the bolt, means stronger than the restraining means to urge the bolt to retracted position, means normally preventing actuation of the stronger means and vehicle speed influenced means operable to release the stronger means.

6. In an automotive vehicle construction, a door member, a frame member, a bolt on one of said members movable to engage the other member, spring means engageable with the bolt to restrain movement of the bolt from engaged position and means subject to the speed of the vehicle to vary the location of the effective engagement between the bolt and the bolt restraining means and to thereby vary the tension of the spring on the bolt.

7. In an automotive vehicle door latch construction, a bolt movable to hold the door closed, means to restrain movement of the bolt from advanced position, means independent of vehicle speed to retract the bolt, vehicle speed controlled means, other means operable to retract the bolt, and means under control of the vehicle speed controlled means to decrease the force required to retract the bolt upon retraction of the bolt by the other retracting means.

8. In a latch construction for doors of automotive vehicles, a bolt, means to advance the bolt, means to retract the bolt, means subject to vehicle speed and operable to cause the retracting means to act, means to hold the bolt retracted, and means to release the holding means.

9. In a latch construction for doors of automotive vehicles, a bolt, means to urge the bolt to engaged position, means normally urging the bolt to retracted position, means to normally prevent action of the second urging means, and vehicle speed controlled means operable to free the preventing means and to permit the second urging means to operate.

10. In an automotive vehicle door latch, a bolt movable to engaged position, means to restrain movement of the bolt from engaged position, means operable at all times to retract the bolt, and vehicle speed influenced means operable to control the force required to actuate the bolt retracting means.

11. In a latch device for a motor vehicle door, a bolt, means to advance the bolt to engaged position, means to cause the bolt to retract from engaged position, the retracting means including a hand operated member on the door operable to retract the bolt under all speed conditions of the vehicle and a finger tip actuated, speed influenced, means operable only when the vehicle speed is below a predetermined rate to cause the bolt to retract.

12. In a latch for automotive vehicle doors, a bolt, means to advance the bolt, means to retract the bolt, actuating means subject to vehicle speed to cause the retracting means to act, and means independent of vehicle speed and independent of the actuating means to cause the bolt to retract.

13. In an automotive vehicle door latch device, a bolt, means to move the bolt to engaged position, hand operated means operable at all times by heavy pressure to release the bolt, finger tip operated means to release the bolt by application of a light force, means to prevent actuation of the finger tip operated means and speed controlled means to render the preventive means of non-effect.

14. In an automotive vehicle door latch, a bolt, means to advance the bolt, means to retract the bolt, control means for the retracting means, the control means including electro-magnetic means and one or more circuits therefor normally open when the vehicle is running, vehicle speed control means to maintain a portion of the circuit closed while the vehicle is at rest and circuit closing means on the door to close another portion of the circuit to thereby actuate the control means.

15. In a latch construction, a bolt movable to engaged and retracted positions, means operable upon application of a light force to cause actuation of the bolt to retracted position, and speed influenced means preventing retraction of the bolt by application of the light force upon the first mentioned means while permitting actuation of the bolt to released position upon application of a heavier force upon the first mentioned means.

16. In an automotive vehicle door latch, a bolt, means to mount the bolt for movement to engaged and to released positions, and manually operable means to cause actuation of the bolt to released position, said last mentioned means including an electro-magnet and one or more circuits therefor, a vehicle speed controlled member, means whereby the vehicle speed controlled member controls the circuit and means whereby the electro-magnet controls the force required to actuate the manually operable means.

17. In an automotive vehicle door latch, a bolt movable to advanced and released positions, means to move the bolt to released position, operating means to release the bolt, means to cause actuation of the operating means, and speed influenced means to prevent functioning of the actuating means when the vehicle speed exceeds a predetermined rate and permitting functioning of the actuating means when the vehicle speed is less than a predetermined rate and means independent of speed and operable to release the bolt.

18. In an automotive vehicle construction, a frame member, a door member hinged to the frame member, a bolt on one of the members movable to engage the other member to hold the door closed, means to release the bolt, and means to actuate the releasing means, the actuating means comprising a member under the influence of a light force and a member under the influence of a heavy force, finger tip operated means effective to operate the member which is under the influence of the light force, and hand operated means to operate the member which is under the influence of the heavy force and means to at times render the finger tip operated means ineffective without effecting the operation of the hand operated means.

19. In a latch construction for the door of an automotive vehicle, a bolt movable to hold the door member closed, means to release the bolt, and vehicle speed controlled means to vary the force required to actuate the bolt releasing means.

20. In an automotive vehicle door latch, a bolt, means accessible from without the vehicle and operable to release the bolt, means accessible from within the vehicle and operable upon application of a heavy force to release the bolt and vehicle speed controlled means accessible from within the vehicle and operable to release the bolt upon the application of a light force only when the vehicle speed is below a certain rate.

21. In an automotive vehicle door latch construction, a bolt movable to advanced and to released positions, vehicle speed controlled electro-magnetic circuit controlled means operable to release the bolt, and means inside and means outside of the vehicle and operable independent of the circuit to control release of the bolt.

22. In an automotive vehicle door latch, a bolt, finger tip controlled means operable to a position to release the bolt, and vehicle speed controlled means independent of the bolt to prevent movement of the finger tip controlled means to a position to release the bolt.

23. In an automotive vehicle door latch, a bolt, means accessible from without the vehicle and operable to release the bolt, a remote control hand operated member operable from within the vehicle to release the bolt under all speed conditions of the vehicle and speed influenced means operable to permit release of the bolt through the action of the remote control upon the application of a light force when the vehicle speed is less than a certain rate.

BURNIE J. CRAIG.

CERTIFICATE OF CORRECTION.

Patent No. 2,187,933. January 23, 1940.

BURNIE J. CRAIG.

It is hereby certified that error appears in the printed specification of the above numbered patent requiring correction as follows: Page 2, first column, line 33, for "speedmeter" read speedometer; and second column, line 10, for "pring" read spring; page 4, second column, line 38, claim 5, for the word "lock" read bolt; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.